United States Patent
Churukian et al.

(10) Patent No.: US 11,591,011 B1
(45) Date of Patent: Feb. 28, 2023

(54) DYNAMIC VEHICLE STEERING AND/OR SUSPENSION CONSTRAINTS

(71) Applicant: Zoox, Inc., Foster City, CA (US)

(72) Inventors: Zachary Stuart Churukian, San Francisco, CA (US); Johannes Edren, Belmont, CA (US); Justin Calvin Leung, San Francisco, CA (US); Ahditya Melkote, Foster City, CA (US); David Evan Zlotnik, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 12 days.

(21) Appl. No.: 17/459,901

(22) Filed: Aug. 27, 2021

(51) Int. Cl.
  *B62D 6/00* (2006.01)
  *B60W 60/00* (2020.01)
(52) U.S. Cl.
  CPC .............. *B62D 6/00* (2013.01); *B60W 60/001* (2020.02)
(58) Field of Classification Search
  CPC .............................. B62D 6/00; B60W 60/001
  See application file for complete search history.

(56) References Cited

U.S. PATENT DOCUMENTS 10,829,149 B1  11/2020  Garimella et al.

OTHER PUBLICATIONS

U.S. Appl. No. 16/917,431, filed Jun. 30, 2020, Funke, et al., "Trajectory Determination for Four-Wheel Steering," 53 pages.
U.S. Appl. No. 17/246,375, filed Apr. 30, 2021, Melkote, et al., "Determining Vehicle Ride Height Using a Ball Joint Sensor," 46 pages.

*Primary Examiner* — Mathew Franklin Gordon
(74) *Attorney, Agent, or Firm* — Lee & Hayes, P.C.

(57) ABSTRACT

This application describes systems and techniques for adjusting one or more setting(s) of a vehicle based on detected condition(s) to avoid damage due to contact of the tires with a body, chassis, or other components of the vehicle. In some instances, the vehicle may determine a ride height of the vehicle, determine a limited range of steering angles based at least in part on the ride height, and control operation of the steering system of the vehicle based at least in part on the limited range of steering angles. In some instances, the vehicle may determine a steering angle of the vehicle, determine a limited range of ride heights based at least in part on the steering angle, and control operation of the suspension system of the vehicle based at least in part on the limited range of ride heights.

20 Claims, 5 Drawing Sheets

| Steering Rack Stroke | Full Steer + | | | 0.7 Steer + | | | Straight | | | 0.7 Steer - | | | Full Steer - | | |
|---|---|---|---|---|---|---|---|---|---|---|---|---|---|---|---|
| Compliance | Fore | None | Aft | Fore | None | Aft | Fore | None | Aft | Fore | None | Aft | Fore | None | Aft |
| Full bump | | | | | | | | | | | | | | | |
| 0.3 bump | | | | | | | | | | | | | | | |
| 0.25 bump | | | | | | | | | | | | | | | |
| default height | | | | | | | | | | | | | | | |
| 0.25 reb | | | | | | | | | | | | | | | |
| 0.6 reb | | | | | | | | | | | | | | | |
| 0.8 reb | | | | | | | | | | | | | | | |
| Full reb | | | | | | | | | | | | | | | |

FIG. 3

DYNAMIC VEHICLE STEERING AND/OR SUSPENSION CONSTRAINTS

BACKGROUND

Vehicles often include a steering system and a suspension system for controlling maneuvering of the vehicle. The steering system may be used to maneuver the vehicle along roads, causing the vehicle to travel through curves and provide general maneuverability, and the suspension system may be used to smooth out a ride, causing the vehicle to travel through road bumps and other kinetic impacts safely. Used in combination with a powertrain, the steering and suspension systems of the vehicle may be used to control the vehicle to maneuver between locations and provide a comfortable ride experience to users. Steering systems are typically designed so that the tires of the vehicle do not rub against a body or chassis of the vehicle during normal operation of the vehicle. Some conventional steering systems use mechanical steering stops to limit a range of steering angles to prevent the tires from contacting the chassis of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates an example adjustment lookup table used by the example system for implementing the techniques described herein.

DETAILED DESCRIPTION

Figure 1:
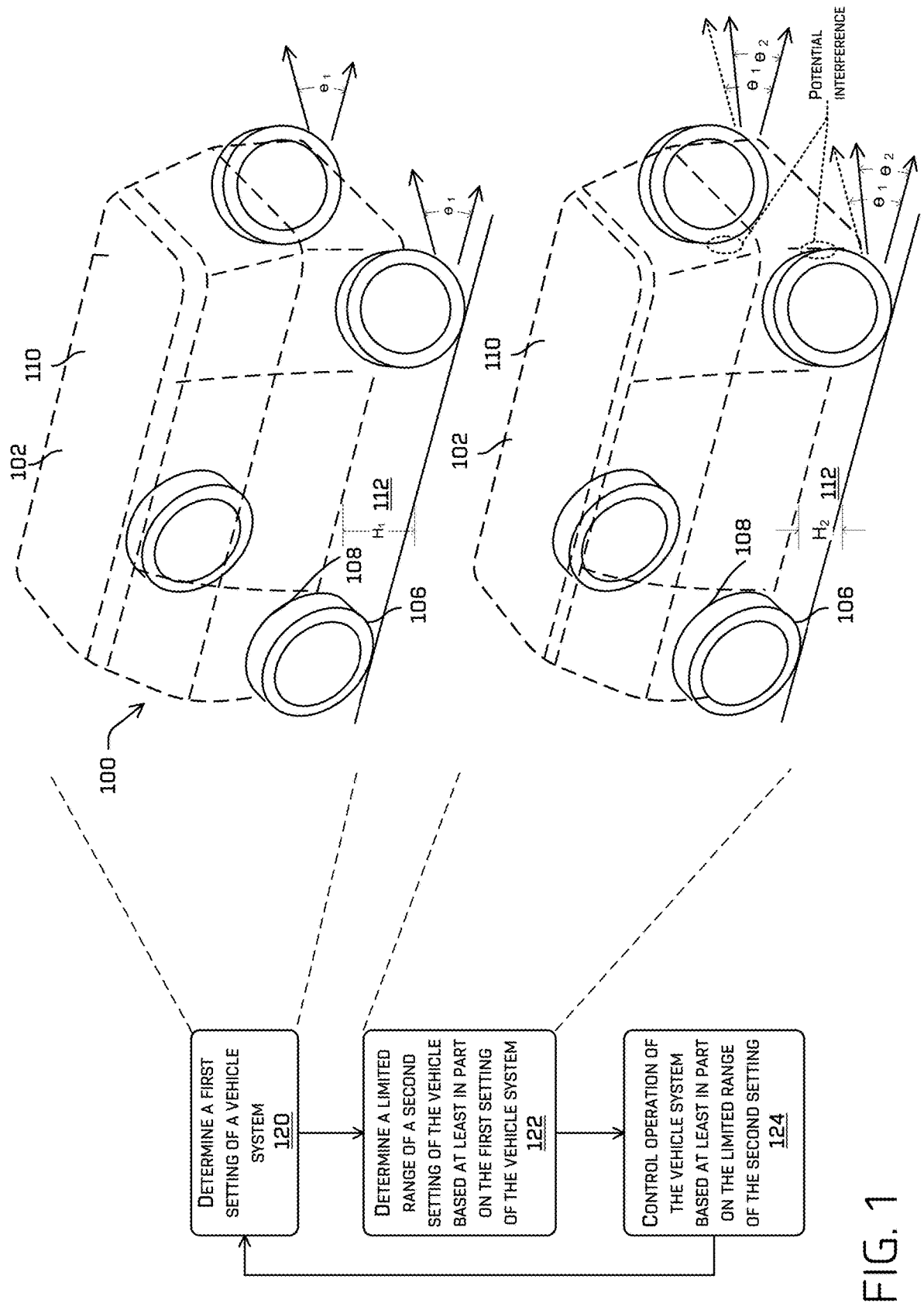
FIG. 1 illustrates an example environment for making one or more adjustment(s) to setting(s) of a vehicle to provide software steering limits for the vehicle.

As discussed above, conventional steering systems are typically designed so that the tires of the vehicle do not rub against a body or chassis of the vehicle during normal operation of the vehicle. However, designing a vehicle steering system so that the tires of the vehicle are prevented from coming into contact with the body or chassis of the vehicle under all operating conditions may require large clearances and/or may limit the turning radius of the vehicle. Additionally, in case of vehicles having an active suspension in which a ride height of the vehicle can be adjusted (raised or lowered), a steering angle that may be acceptable at a first ride height (e.g., the tires do not contact the body or other components of the vehicle at the first ride height) may not be acceptable at a second ride height (e.g., the tires contact the body or other components of the vehicle at the second ride height).

This application describes systems and techniques for adjusting one or more setting(s) of a vehicle based on detected condition(s) to avoid damage due to contact of the tires (or other steering or suspension components) with a body, chassis, or other components of the vehicle. For example, a ride height of a vehicle may be determined and a limited range of steering angles may be determined based at least in part on the ride height, the limited range of steering angles being less than a maximum physical range of steering angles of the steering system of the vehicle system. The limited range of steering angles can be associated with a range of positions of a tire of the vehicle that are clear of other components of the vehicle at the ride height, while at least one angle outside the limited range of steering angles and within the maximum physical range of steering angles is associated with a position of the tire of the vehicle that interferes with another component of the vehicle at the ride height. In one example, the limited range of steering angles comprises 70% of the maximum physical range of steering angles of the steering system of the vehicle. Operation of the steering system of the vehicle may be adjusted based at least in part on the limited range of steering angles to avoid contact between the tires (and/or other steering and suspension components) with the body, chassis, or other components of the vehicle. The steering system of the vehicle can then be controlled based at least in part on the limited range of steering angles. In some examples, the limited range of steering angles may be absolute limits on permissible steering angle of the vehicle at all speeds and/or conditions. In such examples, the limited range of steering angles may apply to and limit other vehicle systems (e.g., stability control systems). In some examples, other vehicles systems (e.g., stability control systems) command steering angles within the absolute limits permissible discussed herein when the stability control system is active. However, in other examples, the limited range of steering angles may apply only in certain modes of operation and/or operational drive domains of the vehicle.

As another example, a steering angle of the vehicle may be determined and a limited range of ride heights may be determined based at least in part on the steering angle, the limited range of steering angles being less than a maximum physical range of ride heights of a suspension system of the vehicle. The limited range of ride heights can be associated with a range of positions of a tire of the vehicle that are clear of other components of the vehicle at the steering angle, while at least one ride height outside the limited range of ride heights and within the maximum physical range of ride heights is associated with a position of the tire of the vehicle that interferes with another component of the vehicle at the steering angle. The suspension system of the vehicle can then be controlled based at least in part on the limited range of ride heights.

In some examples, determining the limited range of steering angles and/or the limited range of ride heights may take into account adjustments or settings of the various steering and suspension components, such as toe angle, caster, camber, suspension travel limits, or the like. Additionally alternatively, the vehicle may include actuators coupled to the suspension and/or steering components to automatically adjust toe angle, caster, camber, suspension travel limits, and/or other settings of the suspension and/or steering system to avoid interference between the tires (and/or other steering and suspension components) with the body, chassis, or other components of the vehicle.

In some examples, the limited range of steering angles and/or the limited range of ride heights may additionally or alternatively be based on an operational drive domain of the vehicle. As used herein, an "operational drive domain" is a condition of the vehicle associated with a set of rules or operating constraints with which the vehicle must comply. The operational drive domain may be determined based on a location of the vehicle (e.g., on a road, at a charging station, at a maintenance facility, etc.), based on an instruction received from an operator (e.g., a service technician local to the vehicle, a remote teleoperator, etc.), based on an operating status of the vehicle (e.g., on route to a destination, in autonomous mode, in manual mode, in service, charging, etc.), and/or other factors. For example, in some instances, the vehicle may determine the location of the vehicle and control one or more settings based at least in part on the location of the vehicle. For instance, if the vehicle system determines that the vehicle is in a pickup/drop off location, the vehicle system may lower a ride height of the vehicle to make loading/unloading easier, and may automatically determine a limited range of steering angles of the vehicle associated with the lower ride height of the vehicle to avoid interference between components of the vehicle. As another example, if the vehicle system determines that the vehicle is in a location of a charging station or a location of a maintenance facility, the vehicle system may automatically raise the ride height of the vehicle to a pre-defined ride height to provide clearance to pass over physical charging contacts or other devices located beneath the vehicle and constrain the position of the steering system within a limited range of steering angles based on the pre-defined ride height to avoid interference between components of the vehicle. As yet another example, if the vehicle system determines that the vehicle is entering a parking garage, the vehicle system may lower a ride height of the vehicle to clear a ceiling of the parking garage, and may automatically determine a limited range of steering angles of the vehicle associated with the lower ride height of the vehicle to avoid interference between components of the vehicle. Additionally or alternatively, in some examples, an operational drive domain may be associated with a maximum range of steering angles and/or a maximum range of ride heights. For instance, in an operational drive domain associated with a maintenance facility and/or a command from a maintenance technician, limits on the range of steering angle and/or ride height may be removed to allow the vehicle to be controlled through its full range of steering angles and/or ride heights without regard to potential interference between vehicle components. In some examples, an operational drive domain may be associated with an environmental condition, such as a weather condition or a traffic condition. Furthermore, in some examples, ranges of steering angles and/or ride heights associated with an operational drive domain may depend at least in part on a hardware configuration of the vehicle and/or a ground clearance of the vehicle. Thus, different vehicles having different hardware configurations and/or ride heights may have different limited ranges of steering angles and/or ride heights for a given operational drive domain.

In some instances, the vehicle may include an autonomous vehicle that travels through an environment along a route controlled by a planner component of the vehicle. However, in other examples, the techniques described herein may be applicable to other types of vehicles, such as manually driven vehicles, which can be driven along a route by a human driver. Along the route, the vehicle may perform various maneuvers (e.g., turns, stops, etc.) and travel at different ride heights. For example, the vehicle may travel at a first ride height while traveling on a road surface along the route and a suspension system of the vehicle may lower the vehicle to a second, lower ride height during a charging operation. In some examples, increasing the ride height of the vehicle allows the vehicle to travel over obstacles, such as bumps, rocks, and other uneven road surfaces. In some examples, decreasing the ride height of the vehicle provides a lower center of gravity of the vehicle, which provides increased stability and cornering capability and may be desired for high speed travel over smooth road surfaces.

In some instances, the vehicle may include front wheel steering, rear wheel steering, and/or four-wheel steering, in which case the ride height and steering angle can be determined and controlled for each end of the vehicle independently. For example, a vehicle system may determine a first ride height of a first end of the vehicle and determine a first limited range of steering angles based at least in part on the first ride height for the first end. The vehicle system may further determine a second ride height of a second end of the vehicle and determine a second limited range of steering angles based at least in part on the second ride height for the second end. In some examples, the first limited range of steering angles and the second limited range of steering angles may be the same. In other examples, the first limited range of steering angles and the second limited range of steering angles may be different.

In some instances, the vehicle system may determine a current ride height of the vehicle system using one or more sensor(s). For example, one or more ride height sensors may be used to detect the ride height of the vehicle, or positioning of the suspension system of the vehicle with respect to a support surface. In some instances, the vehicle system may determine a commanded ride height of the vehicle system in response to input from an automatic stabilization system (e.g., a machine learning mechanism), or in response to input from an operator of the vehicle. In some instances, the vehicle system may determine a future anticipated or planned ride height of the vehicle system. In some examples, the vehicle system may use the current ride height, the future anticipated or planned ride height, or the commanded ride height to determine the limited range of steering angles. In other examples, the vehicle system may determine the limited range of steering angles based on a combination of the current ride height, the anticipated or planned ride height, and/or the commanded ride height. For example, the vehicle system may determine the limited range of steering angles based on the average value of the current ride height and the commanded ride height. Additional details of example techniques for determining ride height of a vehicle can be found in U.S. application Ser. No. 17/246,375, filed Apr. 30, 2021, which is incorporated herein by reference for all purposes.

In some instances, the vehicle system may send an indication of the limited range of steering angles to a planner component of the vehicle system that is configured to plan maneuvers of the vehicle system. Upon receiving the indication of the limited range of steering angles, the planner component of the vehicle system may constrain the position of the steering system within the limited range of steering angles. The planner component may use this information when planning future routes for a vehicle to follow. For example, a route may be selected because other routes utilizing a steering angle outside of the limited range may be unavailable. This may be because a ride height of the vehicle may be anticipated to change during the route to adjust for road conditions, planned actions, etc.

In some instances, the vehicle system may include an executive control unit (ECU) or other controller configured to control operation of the steering system and/or suspension system of the vehicle. In the event that a planning component of the vehicle requests a steering angle beyond the limited range of steering angles, the controller may issue an error and/or may constrain the steering system so as not to exceed the limited range of steering angles. In some examples, the error may be fed back to the planning component to plan an alternative path and/or the error may be logged for inspection or review by an operator or technician. In some examples, the controller may command the vehicle to stop or may, independently of the planner, command a vehicle to come to a safe stop (e.g., steer to the side of the ride and decelerate). The controller may provide an additional or independent level of assurance to a planner that steering or other limits will not be exceeded.

In some instances, the planner component may request a steering angle to be implemented using two-wheel steering (e.g., using only front or leading wheels of the vehicle) and the vehicle system may automatically generate a four-wheel steering command based on the received two-wheel steering request to supplement a commanded steering angle. In some examples, this type of conversion may minimize the amount that each wheel of the vehicle must be turned in order to achieve a desired maneuver. Thus, by converting a requested two-wheel steering command to a four-wheel steering command, the vehicle system may be able to achieve a sharper turn or maneuver without exceeding a limited range of steering angles imposed for a given ride height. The conversion of requested two-wheel steering command to a four-wheel steering command may be performed by the planning component, the controller, or another system.

In some instances, instead of or in addition to limiting the steering angle of the vehicle, the vehicle system may limit the ride height of the vehicle to avoid damage due to interference between the tires and a body, chassis, or other components of the vehicle. To avoid damage due to interference between the tires and the chassis, the vehicle system may determine a steering angle of the vehicle and determine a limited range of ride height of the vehicle based at least in part on the steering angle. The vehicle system may send an indication of the limited range of ride height to the planner component of the vehicle system that is configured to plan maneuvers of the vehicle system. Upon receiving the indication of the limited range of ride height, the planner component of the vehicle system may constrain the position of the suspension system within the limited range of ride height. For example, the vehicle may steer at a relatively large (i.e., sharp) angle to enter a parking spot for picking up or dropping off a passenger. In some examples, the vehicle system may attempt to lower the ride height of the vehicle to make loading and unloading people or cargo easier. However, when the vehicle steers at a relatively large angle and the vehicle may constrain the ride height of the vehicle from being lowered beyond a limited range of ride heights associated with the current steering angle to prevent the tires of the vehicle (or other steering or suspension components) may contact a body, chassis, or other components of the vehicle.

In some instances, the vehicle may include a first suspension system located at the front (or first end) of the vehicle and a second suspension system located at the rear (or second end) of the vehicle. The first suspension and the second suspension system may include various components, such as valve blocks, actuators, strut(s), fluid reservoirs, pump(s), accumulator(s), and so forth. In some instances, strut(s) of the first suspension system and the second suspension system may be actuated to similar or different lengths (e.g., travel length). For example, the struts of the first suspension may be extended to a first length and the struts of the second suspension system may be extended to a second length that is less than the first length. However, in some instances, each of the strut(s) of the suspension system(s) may be independently actuatable and extended to respective lengths to have varying ride heights. That is, in some instances, the suspension adjustments may be four independent adjustments, one for each strut of the vehicle.

Additionally, or alternatively, the vehicle system may determine a speed of the vehicle and control one or more settings based at least in part on the speed of the vehicle. For example, if the vehicle system determines that the vehicle is operating above a speed threshold, the vehicle system may constrain the steering system to within a range of steering angles and/or the position of the suspension system to within a limited range of ride heights to avoid interference between components of the vehicle and/or to provide increased stability and cornering capability.

In light of the above, the present application describes systems and techniques for adjusting one or more setting(s) of a vehicle based on detected condition(s) to avoid damage to the tires, body, chassis, steering and suspension systems, and/or other components of the vehicle caused by interference between components of the vehicle. The vehicle (or another communicatively coupled system) may determine adjustment(s) or setting(s) to the vehicle in real-time or on a dynamic basis as the vehicle travels along a route and/or in response to detecting a triggering event (e.g., change in location, receipt of a command or message from an operator, change in ride height, change in steering angle, etc.). The adjustment(s) and/or setting(s) may include, for example, adjustment(s) to steering and/or suspension systems of the vehicle. Additionally, such adjustment may further be based on the speed of the vehicle and/or the operational drive domain of the vehicle. As such, any number of factors may be used to determine the steering settings and/or the suspension settings to prevent damage to the various components of the vehicle and to optimize user experience (e.g., user comfort).

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates a pictorial flow diagram of an example process for adjusting one or more setting(s) of a vehicle based on detected condition(s) to avoid damage due to contact of the tires (or other steering or suspension components) with a body, chassis, or other components of the vehicle. In FIG. 1, an example environment 100 is shown that includes a vehicle 102, which may be traveling on a road in a direction of travel.

As vehicle 102 travels along a route, the vehicle 102 may perform various maneuvers. For example, the vehicle 102 may steer along given routes, may stop, speed up, turn, swerve, change lanes, and so forth. Throughout a ride or during travel, the vehicle 102 may perform various maneuvers (e.g., turns, stops, etc.) and travel at different ride heights. For example, a vehicle system 110 of the vehicle 102 may lower a ride height when the vehicle approaches a charging station and/or when the vehicle enters a parking garage. As other examples, the vehicle system 110 may temporarily raise the ride height of the vehicle 102 to safely pass over uneven road surfaces and may temporarily lower the ride height of the vehicle 102 to travel over a curved road. The increased the ride height of the vehicle 102 allows the vehicle 102 to travel over obstacles and the decreased ride height of the vehicle 102 improves clearance, stability and cornering capability of the vehicle 102. Decreasing the ride height may additionally or alternatively bring charging components of the vehicle (e.g., electrical terminals or inductive charging coils) into contact or closer proximity to electrical contacts or inductive charging coils of a charging station. However, a steering angle that may be acceptable at a first ride height $H_1$ (e.g., the tires do not contact the body or other components of the vehicle at the first ride height) may not be acceptable at a second ride height $H_2$ (e.g., the tires contact the body or other components of the vehicle at the second ride height). To avoid damage due to contact of the tires (or other steering or suspension components) with a body, chassis, or other components of the vehicle 102 and to improve vehicle performance, the vehicle system 110 may adjust one or more setting(s) of a vehicle based on detected condition(s). As shown in FIG. 1, the vehicle system 110 may adjust the maximum range of steering angle from $\theta_1$ to $\theta_2$ when the ride height changes from $H_1$ to $H_2$.

In some instances, the vehicle system 110 may determine a ride height 112 of the vehicle 102 and determine a limited range of steering angles at least based in part on the ride height 112. For example, the vehicle 102 may include one or more ride height sensor(s) mounted to the chassis 108 of the vehicle 102. The ride height sensor(s) may detect the ride height 112 of the vehicle 102, or positioning of a vehicle component or a vehicle suspension system of the vehicle 102 with respect to the road or support surface. The vehicle system 110 may use the ride height 112 detected by the ride height sensor(s) to determine a limited range of steering angles. As another example, the vehicle system 110 may determine a commanded ride height of the vehicle 102 in response to an input from an automatic stabilization system of the vehicle 102 (e.g., a machine learning mechanism), or in response to input from an operator of the vehicle 102. For example, the operator may use one or more interface elements presented on a display screen associated with the vehicle 102 to raise or lower the ride height 112 of the vehicle. By way of example and not limitation, the interface element(s) may be presented to the operator on a display screen of the vehicle, a display screen of a computing device coupled to the vehicle by wired or wireless connection such as a diagnostic computing device of a service technician, and/or computing device of a remote teleoperator.

The limited range of steering angles can be associated with a range of positions of a tire of the vehicle 102 that are clear of other components of the vehicle 102 at the ride height 112, while at least one angle outside the limited range of steering angles and within the maximum physical range of steering angles is associated with a position of the tire of the vehicle 102 that interferes with another component of the vehicle 102 at the ride height 112. In one example, the limited range of steering angles comprises 70% of the maximum physical range of steering angles of the steering system of the vehicle 102. Operation of the steering system of the vehicle 102 may be adjusted based at least in part on the limited range of steering angles to avoid contact between the tires (and/or other steering and suspension components) with the body, chassis, or other components of the vehicle 102. The steering system of the vehicle can then be controlled based at least in part on the limited range of steering angles.

In some instances, the vehicle system 110 may determine a steering angle of the vehicle 102 and determine a limited range of ride heights at least based in part on the steering angle. For example, the vehicle 102 may include one or more steering angle sensor(s) connected to steering wheel 106 and/or another component of a steering system of vehicle 102. The steering angle sensor(s) may determine a current steering angle of the vehicle 102 and the vehicle system 110 may use the current steering angle detected by the steering angle sensor(s) to determine a limited range of ride heights. As another example, the vehicle system 110 may determine a commanded steering angle of the vehicle 102 in response to an input from an automatic stabilization system of the vehicle 102 (e.g., a machine learning mechanism), or in response to input from an operator of the vehicle 102. As another example, the vehicle system 110 may determine a future anticipated steering angle of the vehicle 102.

In some instances, the vehicle system 110 may determine the limited range of steering angles and/or the limited range of ride heights based on an operational drive domain of the vehicle 102. The operational drive domain may be determined based on a location of the vehicle 102 (e.g., on a road, at a charging station, at a maintenance facility, etc.), based on an instruction received from an operator (e.g., a service technician local to the vehicle, a remote teleoperator, etc.), based on an operating status of the vehicle 102 (e.g., on route to a destination, in autonomous mode, in manual mode, in service, charging, etc.), based on an environmental condition (e.g., a weather condition, a traffic condition), and/or other factors. Additionally, as noted above, ranges of steering angles and/or ride heights associated with an operational drive domain may depend at least in part on a hardware configuration of the vehicle and/or a ground clearance of the vehicle. Thus, different vehicles having different hardware configurations and/or ride heights may have different limited ranges of steering angles and/or ride heights for a given operational drive domain For example, the vehicle system 110 may determine a location of the vehicle 102 and determine the limited range of steering angles and/or the limited range of ride heights based at least in part on the location of the vehicle 102. In one example scenario, the operator of the vehicle 102 may inspect, repair, maintain or charge the vehicle 102 at a central location, such as a local maintenance facility or a charging station, and may control or instruct the vehicle 102 to travel in a default or commanded ride height. Once at the central location, the vehicle system 110 may automatically set the ride height of the vehicle to a pre-defined ride height and limit the steering angle of the vehicle 102 based on the pre-defined ride height of the vehicle 102 to avoid interference between components of the vehicle 102. Setting the ride height to the pre-defined ride height may additionally or alternatively bring charging components of the vehicle 102 (e.g., electrical terminals or inductive charging coils) into contact or closer proximity to electrical contacts or inductive charging coils of a charging station.

As another example, the vehicle system 110 may receive an instruction from an operator and determine to remove the limits on range of steering angle and/or ride height. For instance, in an operational drive domain associated with a maintenance facility and/or a command from a maintenance technician, limits on range of steering angle and/or ride height may be removed to allow the vehicle to be controlled through its full range of steering angles and/or ride heights without regard to potential interference between vehicle components.

As discussed above, the vehicle 102 may include a steering system for steering the vehicle 102, one or more suspension system(s) for absorbing impacts, increasing traction on the road, and/or reducing vibration, and a drive mechanism for powering the vehicle 102. The vehicle 102 may additionally, or alternatively, include other system(s) for permitting operation of the vehicle 102.

The steering system of the vehicle 102 may be capable of two-wheel steering and/or four-wheel steering. For example, a front of the vehicle 102 may include two wheels and a rear of the vehicle 102 may include two wheels. In some instances, the two wheels at the front may steer the vehicle 102, the two wheels at the rear may steer the vehicle 102, and/or the two wheels at the front and the two wheels at the rear may simultaneously steer the vehicle 102 (i.e., four-wheel steering). Additionally, in four-wheel steering, the front two wheels and the rear two wheels may be controlled or actuated by varying amounts (or percentage) for steering the vehicle 102 along a route or during a particular maneuver. For example, to make a turn, the front wheels may be actuated by a first amount (or percentage) and the rear wheels may be actuated by a second amount (or percentage). In some instances, the vehicle 102 may include four-wheel steering capabilities, such as those described in U.S. patent application Ser. No. 16/917,431 titled "Trajectory Determination for Four-Wheel Steering," which is incorporated by reference herein in its entirety for all purposes or those described in U.S. Pat. No. 10,829,149 titled "Steering Control for Vehicles," which is incorporated herein by reference in its entirety for all purposes.

In some instances, the vehicle 102 may include a first suspension system located at the front and a second suspension system located at the rear. The first suspension and the second suspension system may include various components, such as valve blocks, actuators, strut(s), fluid reservoirs, pump(s), accumulator(s), and so forth. In some instances, strut(s) of the first suspension system and the second suspension system may be actuated to similar or different lengths. Each of the strut(s) of the suspension system(s) may also be independently actuatable and extended to respective lengths. For example, the strut(s) at each wheel may be independently actuatable according to respective setting(s). In such instances, each of the strut(s) may have different travel heights and/or setting(s). The first suspension system and the second suspension system may also be actuated such that strut(s) on a first side of the vehicle 102 may be extended to a first length and strut(s) on a first side of the vehicle 102 may be extended to a second length that is less than the first length. With the setting(s) to the suspension system(s), the vehicle 102 may tailor combined roll and pitch to adjust experienced accelerations.

The drive mechanism(s) of the vehicle 102 may provide independent power to each of the wheels at the front 108 and/or the rear 110 for accelerating the vehicle 102 at different rates and/or moving the vehicle 102 at various speeds. In some instances, motor(s) operably coupled to the wheels at the front and the rear may power the wheels or accelerate the vehicle 102 at the same rate. In some instances, the vehicle 102 may be bi-directional and capable of traveling in multiple directions. That is, at times the vehicle 102 may be controlled such that a first end of the vehicle is a front or leading end of the vehicle while a second end of the vehicle is a rear or trailing end of the vehicle, while at other times the vehicle may be controlled such that the second end of the vehicle is the front or leading end of the vehicle while the first end of the vehicle is the rear or trailing end of the vehicle.

Turning to the flow diagram in FIG. 1, an operation 120 may include determining a first setting of a first vehicle actuator included in the vehicle 102. The first setting may include a ride height setting or a steering angle setting. As illustrated in FIG. 1 and as discussed above, vehicle 102 may include the ride height sensor(s), and a vehicle system 110 may determine a current ride height of the vehicle 102 based on data received from the ride height sensor(s). The vehicle 102 may further include the steering angle sensor(s) and the vehicle system 110 may determine a current steering angle of the wheels 106 based on data received from the one or more ride height sensor. In some instances, the vehicle system 110 may determine a commanded ride height 112 or a commanded steering angle of the wheels 106 based on an input from an operator of the vehicle or an input form an automatic stabilization system. In some instances, the vehicle system 110 may determine a future anticipated or planned ride height 112 or a future anticipated or planned steering angle of the wheels 106.

An operation 122 may include determining a limited range of a second setting of a second vehicle actuator of the vehicle system 110 based at least in part on the first setting of the first vehicle actuator. The second setting may include a steering angle setting or a ride height setting. As noted above, an operational drive domain or other state of the vehicle may additionally or alternatively be taken into account as a basis on which to set the limited range of the second setting.

In some instances, the first setting of the first vehicle actuator may include a ride height setting and the second setting of the second vehicle actuator may include a steering angle setting. In that case, the first vehicle actuator may comprise a suspension actuator (e.g., hydraulic cylinder, strut, air spring, etc.) that is actively controllable to adjust a ride height of the vehicle 102, and the second vehicle actuator may comprise a steering actuator (e.g., steering motor, pump, rack, etc.) that is actively controllable to adjust a steering angle of the vehicle 102. The vehicle system 110 may determine the ride height 112 of the vehicle 102 and determine a limited range of steering angles based at least in part on the ride height 112. The limited range of steering angles is associated with a range of positions of the wheel 106 of the vehicle system 110 that are clear of other components of the vehicle system 110 at the ride height 112, and at least one angle outside the limited range of steering angles and within a maximum physical range of steering angles is associated with a position of the wheel 106 of the vehicle system 110 that interferes with another component of the vehicle system 110 at the ride height 112. In one example, the maximum physical range of steering angles may be about +/−25 degrees relative to a longitudinal centerline of the vehicle, and the limited range of steering angles includes 70% of the maximum physical range of steering angles of the steering system of the vehicle 102. However, in other examples, the maximum physical range of steering angles may be greater than or less than +/−25 degrees. By way of example and not limitation, maximum physical ranges of steering angles for various different vehicles may include +/−20 degrees, degrees, +/−27 degrees, +/−30 degrees, +/−35 degrees, +/−45 degrees, or any other maximum physical range of steering angles for a given vehicle configuration. Additionally or alternatively, the degree to which the range of steering angles is limited may be greater than or less than 70%. By way of example and not limitation, the limited range of steering angles may be 50%, 60%, 75%, 80%, 90%, 95%, or any other limited range of steering angles that avoids interference between components of the given vehicle configuration. Additionally, in some examples, different limitations of ranges of steering angles may be applicable to different ride heights and/or operational drive domains. For example, at a first ride height the maximum physical range of steering angles may be used, at a second ride height (which may be greater than or less than the first ride height) a first limited range of steering angles (e.g., 80% of max physical) may be used, and at a third ride height different than (greater than or less than) the first ride height and the second ride height a second limited range of steering angles (e.g., 65% of max physical) may be used.

In some examples, the limited range of steering angles of wheels 106 may be determined based on the current ride height, which is determined based on data received from the ride height sensors included in vehicle 102. In some examples, the limited range of steering angles of wheels 106 may be determined based on the commanded ride height, which is determined based on an input from an operator of the vehicle 102 or an input from an automatic stabilization system of the vehicle 102. In some examples, the limited range of steering angles of wheels 106 may be determined based on the future anticipated or planned ride height.

In some instances, the first setting of the first vehicle actuator may include a steering angle setting and the second setting of the second vehicle actuator may include a ride height setting. In that case, the first vehicle actuator may comprise a steering actuator (e.g., steering motor, pump, rack, etc.) that is actively controllable to adjust a steering angle of the vehicle 102, and second vehicle actuator may comprise a suspension actuator (e.g., hydraulic cylinder, strut, air spring, etc.) that is actively controllable to adjust a ride height of the vehicle 102. The vehicle system 110 may determine the steering angle 114 of the vehicle 102 and determine a limited range of ride heights based at least in part on the steering angle 114. The limited range of the ride height setting is associated with a range of positions of the chassis 108 of the vehicle system that are clear of other components of the vehicle system at the steering angle setting, and at least one angle outside the limited range of the ride height setting and within the maximum physical range of the ride height setting is associated with a position of the chassis 108 of the vehicle system 110 that interferes with another component of the vehicle system 110 at the steering angle 114. In some examples, the maximum physical range of ride heights of the suspension system of the vehicle 102 may range from 50 millimeters to 210 millimeters as measured from a ground plane on which the vehicle is supported to a lowest point on the vehicle body or chassis. However, in other examples, the maximum physical range of ride heights may be greater or less than this range.

In some examples, the limited range of ride heights of the vehicle 102 may be determined based on the current steering angle, which is determined based on data received from the steering angle sensors included in vehicle 102. In some examples, the limited range of ride heights of the vehicle 102 may be determined based on the commanded ride height, which is determined based on an input from an operator of the vehicle 102 or an input from an automatic stabilization system of the vehicle 102. In some examples, the limited range of ride heights of the vehicle 102 may be determined based on the future anticipated or planned steering angle of the vehicle 102.

An operation 124 may include controlling operation of the vehicle system 110 based at least in part on the limited range of the second settings. The vehicle system 110 may send an indication of the limited range of the second settings to a planner component of the vehicle system 110 that is configured to plan maneuvers of the vehicle system 110, and may constrain the planner component to plan maneuvers that position the steering system within the limited range of the second setting.

In some instances, controlling the operation of the vehicle system 110 may further based at least in part on the speed of the vehicle 102. For example, the vehicle 102 may include a speed sensor that is related to the operation of the vehicle, operation of the steering wheels 106, operation of active suspension, and/or operation of systems of the vehicle 102. Based on determining the speed of the vehicle 102 is above a speed threshold, the vehicle system 110 may automatically limit the range of steering angles of a steering system of the vehicle 102 to avoid interference between components of the vehicle 102.

In some instances, controlling operation of the vehicle system 110 may further based at least in part on the operational drive domain, location, or other state of the vehicle 102. For example, in the case of location, the vehicle system 110 may request, and/or receive a three-dimensional map of an environment and may continuously determine a location and/or orientation of the vehicle 102 within the environment, and may determine if the vehicle 102 is in a location of a charging station or a location of a maintenance facility. Based on determining the vehicle 102 is in a location of a charging station or a location of a maintenance facility, the vehicle system 110 may automatically set the ride height of the vehicle 102 to a pre-defined ride height and limit the range of steering angles based on the pre-defined ride height. By limiting the range of steering angles based on the pre-defined ride height, the vehicle system 110 helps to prevent the wheels 106 rub against the chassis 108. Setting the ride height to the pre-defined ride height may additionally or alternatively bring charging components of the vehicle 102 (e.g., electrical terminals or inductive charging coils) into contact or closer proximity to electrical contacts or inductive charging coils of a charging station. In some examples, the location of the vehicle 102 may be determined by a localization component included in the vehicle 102. The localization component can utilize SLAM (simultaneous localization and mapping) or CLAMS (calibration, localization and mapping, simultaneously) to receive image data, LIDAR data, radar data, SONAR data, IMU data (such as data from gyroscopes and/or accelerometers, magnetometers, and/or cameras for obtaining image data for visual odometry or vision-inertial navigation), GPS data, wheel encoder data, and/or the like to accurately determine a location of the vehicle 102.

Figure 2:
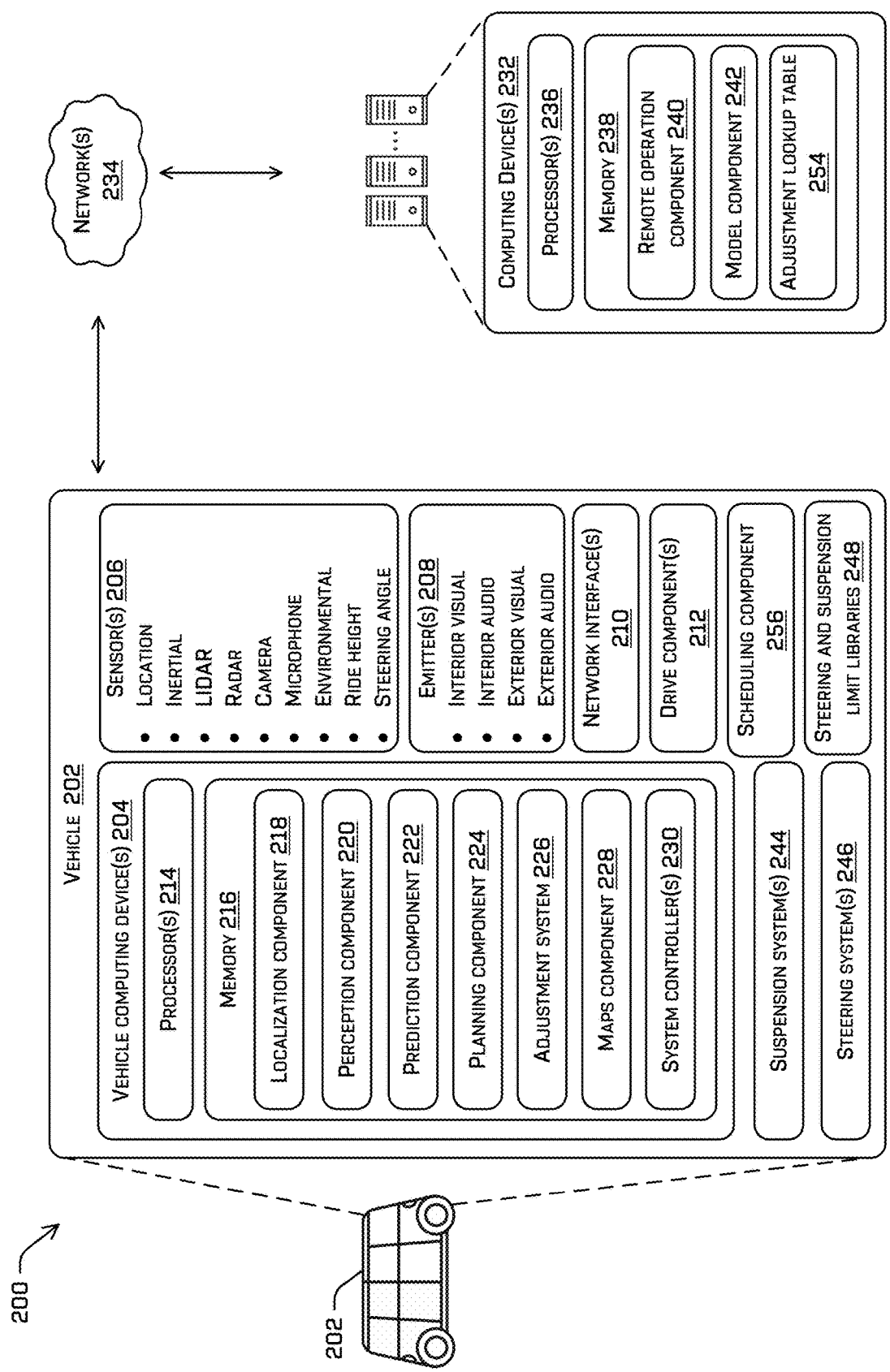
FIG. 2 illustrates a block diagram of an example system for implementing the techniques described herein.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include one or more vehicle computing device(s) 204, one or more sensor(s) 206, one or more emitter(s) 208, one or more network interface(s) 210 (also referred to as communication devices and/or modems), one or more drive component(s) 212, one or more suspension system(s) 244, and/or one or more steering system(s) 246. In some instances, the one or more sensor(s) 206 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ride height sensors, steering angle sensors, etc. The one or more sensor(s) 206 may include multiple instances of each of these or other types of sensors. For instance, the time-of-flight sensors may include individual time-of-flight sensors located at the corners, front, back, sides, and/or top of the vehicle 202. As another example, the camera sensors may include multiple cameras disposed at various locations about the exterior and/or interior of the vehicle 202 (e.g., ceiling, headrest(s), etc.). The one or more sensor(s) 206 may provide input to the vehicle computing device(s) 204.

The one or more emitter(s) 208 may emit light and/or sound. The one or more emitter(s) 208 in this example may include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 208 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 202 may also include one or more network interface(s) 210 that enable communication between the vehicle 202 and one or more other local or remote computing device(s) (e.g., a remote teleoperation computing device) or remote services. For instance, the one or more network interface(s) 210 may facilitate communication with other local computing device(s) on the vehicle 202. Also, the one or more network interface(s) 210 may allow the vehicle 202 to communicate with other nearby computing device(s) (e.g., other nearby vehicles, traffic signals, etc.). The one or more network interface(s) 210 may include physical and/or logical interfaces for connecting the vehicle computing device(s) 204 to another computing device or one or more external networks (e.g., the Internet). For example, the one or more network interface(s) 210 may enable Wi-Fi-based communication such as via frequencies defined by the IEEE 802.11 standards, short range wireless frequencies such as Bluetooth, cellular communication (e.g., 2G, 3G, 4G, 4G LTE, 4G, etc.), satellite communication, dedicated short range communications (DSRC), or any suitable wired or wireless communications protocol that enables the respective computing device to interface with the other computing device(s).

In at least one example, the vehicle 202 may include one or more drive component(s) 212. In some examples, the vehicle 202 may have a single drive component 212. In at least one example, the vehicle 202 may have multiple drive components 212, where individual drive components 212 may be positioned on opposite ends of the vehicle 202 (e.g., the front and the rear, etc.). In at least one example, the drive component(s) 212 may include the one or more sensor(s) 206 to detect conditions of the drive component(s) 212 and/or the surroundings of the vehicle 202. By way of example and not limitation, the sensor(s) 206 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensor(s), such as the wheel encoders may be unique to the drive component(s) 212. In some cases, the sensor(s) 206 on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charging port, etc.). Additionally, the drive component(s) 212 may include a drive system controller which may receive and preprocess data from the sensor(s) 206 and to control operation of the various system(s) and/or component(s) of the vehicle 202. In some examples, the drive system controller may include one or more processor(s) and memory communicatively coupled with the one or more processor(s). The memory may store one or more components to perform various functionalities of the drive component(s) 212. Furthermore, the drive component(s) 212 also include one or more communication connection(s) that enable communication by the respective drive system with one or more other local or remote computing device(s).

The one or more suspension system(s) 244 may absorb dumps, vibrations, motions, and/or accelerations experienced by the vehicle 202 and for controlling the vehicle 202. In some instances, the one or more suspension system(s) 244 may include a first suspension system located at a front (or first end) of the vehicle 202 and a second suspension system located at a rear (or second end) of the vehicle 202. The suspension system(s) 244 may, in some instances, respectively include spring(s), strut(s), actuator(s), valve block(s), pump(s), hydraulic line(s), accumulator(s), and so forth for providing suspension to the vehicle 202. In some instances, each of the suspension system(s) 244 may be independently actuatable and component(s) within each of the suspension system(s) 244 may be independent actuatable. For example, strut(s) of the first suspension system and/or the second suspension system may be independently actuated to various lengths to adjust a position (e.g., yaw, pitch, roll) of the vehicle 202 or at least a position of the vehicle 202. This, in some instances, may affect combined roll and pitch accelerations experienced by the occupant(s). As discussed herein, the suspension system(s) 244 may be controlled and actuated to reduce accelerations experienced by occupant(s) of the vehicle 202. For example, actuating strut(s) of the suspension system(s) 244 to different lengths may change travel heights of the portions of the vehicle 202. The differing travel heights may affect rotational or lateral accelerations.

The one or more steering system(s) 246 may control a steering of the vehicle 202. The steering system(s) 246 may include pump(s), hydraulic line(s), control valve(s), tie rod(s), shaft(s), wheels, hubs, axles, and so forth for steering the vehicle 202 throughout an environment, along a route, or during a maneuver. In some instances, the steering system(s) 246 may steer front or leading wheels of the vehicle 202 and/or rear or trailing wheels of the vehicle 202. In some instances, the vehicle 202 may steer using both the front wheels and/or the back wheels. For example, the vehicle may include four-wheel steering and the front wheels may be independently steerable of the rear wheels, and vice versa. The front wheels and the rear wheels may also steer at different steering angles or by different percentages.

As shown, the vehicle computing device(s) 204 may include one or more processor(s) 214 and memory 216 communicatively coupled with the one or more processor(s) 214. In the illustrated example, the memory 216 of the vehicle computing device(s) 204 stores a localization component 218, a perception component 220, a prediction component 222, a planning component 224, an adjustment system 226, a map component 228, and one or more system controller(s) 230. Though depicted as residing in the memory 216 for illustrative purposes, it is contemplated that the localization component 218, the perception component 220, the prediction component 222, the planning component 224, the adjustment system 226, the map component 228, and the one or more system controller(s) 230 may additionally, or alternatively, be accessible to the vehicle computing device(s) 204 (e.g., stored in a different component of vehicle 202) and/or be accessible to the vehicle 202 (e.g., stored remotely).

In the memory 216 of the vehicle computing device(s) 204, the localization component 218 may include functionality to receive data from the sensor(s) 206 to determine a position of the vehicle 202. For example, the localization component 218 may include and/or request/receive a three-dimensional map of an environment and may continuously determine a location of the autonomous vehicle within the map. In some instances, the localization component 218 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 218 may provide data to various components of the vehicle 202 to determine an initial position of the vehicle 202 for generating a trajectory, as discussed herein.

The perception component 220 may include functionality to perform object detection, segmentation, and/or classification. In some examples, the perception component 220 may provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In some instances, the perception component 220 may include functionality to store perception data generated by the perception component 220. In some instances, the perception component 220 may determine a track corresponding to an object that has been classified as an object type. The stored perception data may, in some examples, include fused perception data captured by the vehicle 202. Fused perception data may include a fusion or other combination of sensor data from sensor(s) 206, such as image sensors, lidar sensors, radar sensors, time of flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.).

In additional and/or alternative examples, the perception component 220 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 220 may use perception algorithms to determine a perception based bounding box associated with an object in the environment based on sensor data. For example, the perception component 220 may receive image data from the one or more sensor(s) 206 and classify the image data to determine that an object is represented in the image data. Then, using detection algorithms, the perception component 220 may generate a two-dimensional bounding box and/or a perception based three-dimensional bounding box associated with the object. The perception component 220 may further generate a three-dimensional bounding box associated with the object. The three-dimensional bounding box may provide additional information such as a location, orientation, pose, and/or size (e.g., size, width, height, etc.) associated with the object.

The prediction component 222 may generate one or more probability maps representing prediction probabilities of possible locations of one or more objects in an environment. For example, the prediction component 222 may generate one or more probability maps for vehicles, pedestrians, animals, and the like within a threshold distance from the vehicle 202. In some instances, the prediction component 222 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 224 may determine a path for the vehicle 202 to follow to traverse through an environment. For example, the planning component 224 may determine various routes and paths and various levels of detail. In some instances, the planning component 224 may determine a route to travel from a first location (e.g., a current location) to a second location (e.g., a target location). For the purpose of this discussion, a route may be a sequence of waypoints for traveling between two locations. As non-limiting examples, waypoints include streets, intersections, GPS coordinates, etc. Further, the planning component 224 may generate an instruction for guiding the vehicle 202 along at least a portion of the route from the first location to the second location. In at least one example, the planning component 224 may determine how to guide the vehicle 202 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 224 may alternatively, or additionally, use data from the perception component 220 and/or the prediction component 222 to determine a path for the vehicle 202 to follow to traverse through an environment. For example, the planning component 224 may receive data from the perception component 220 and/or the prediction component 222 regarding objects associated with an environment. Using this data, the planning component 224 may determine a route to travel from a first location (e.g., a current location) to a second location (e.g., a target location) to avoid objects in an environment. In at least some examples, such a planning component 224 may determine there is no such collision free path and, in turn, provide a path which brings vehicle 202 to a safe stop avoiding all collisions and/or otherwise mitigating damage.

The adjustment system 226 may determine different adjustment(s) or setting(s) of the suspension system(s) 244, and/or the steering system(s) 246 to avoid damage due to contact of the tires (or other steering or suspension components) with a body, chassis, or other components of the vehicle 202. In some instances, the adjustment system 226 may determine a ride height of the vehicle 202 and make adjustment(s) to the steering system(s) 246 (e.g., adjusting the range of steering angles) to prevent potential damage due to interference between components of the vehicle 202. The adjustment system 226 may store the ride height and the corresponding range of steering angles in steering and suspension limit libraries 248 for future use. Similarly, in some instance, the adjustment system 226 may also determine a steering angle of the vehicle 202 and make adjustment(s) to the suspension(s) 244 (e.g., adjusting the range of ride heights) to prevent potential damage due to interference between components of the vehicle 202. The adjustment system 226 may store the steering angle and the corresponding range of ride heights in the steering and suspension limit libraries 248 for future use.

In some examples, the adjustment system 226 may receive a current ride height from the sensor(s) 206 and determine a limited range of steering angles based at least in part on the current ride height detected by the sensor(s) 206.

In some examples, the adjustment system 226 may receive a future anticipated or planned ride height and determine a limited range of steering angles based at least in part on the future anticipated or planned ride height. In some examples, the adjustment system may receive a commanded ride height from the system controller(s) 230 and determine a limited range of steering angles based at least in part on the commanded ride height. The adjustment system 226 may transmit the limited range of steering angles to the planning component 224 and the planning component 224 may plan maneuvers that position the steering system 246 within the limited range of steering angles.

In some examples, the adjustment system 226 may receive a current steering angle from the sensor(s) 206 and determine a limited range of ride heights based at least in part on the current steering angle detected by sensor(s) 206. In some examples, the adjustment system 226 may receive a future anticipated or planned steering angle and determine a limited range of ride heights based at least in part on the future anticipated or planned steering angle. In some examples, the adjustment system 226 may receive a commanded steering angle from the sensor(s) 206 and determine a limited range of ride heights based at least in part on the commanded steering angle. The adjustment system 226 may transmit the limited range of ride heights to the planning component 224 and the planning component 224 may plan maneuvers that position the suspension system(s) 244 within the limited range of ride heights.

The planning component 224 may generate or cause instructions or commands to be transmitted to the suspension system(s) 244 and/or the steering system(s) 246. For example, the planning component 224 may transmit an instruction for the steering system(s) 246 to steer the wheel(s) at certain angles, amounts, or percentages. As another example, planning component 224 may transmit an instruction for the suspension system(s) 244 to raise or lower the ride height of the vehicle 202 to certain heights, amounts, or percentages.

In some instances, the planning component 224 may receive a location of the vehicle 202 from the sensor(s) 206 and/or localization component 218, and may plan the operation of the suspension system(s) 244 and/or the steering system(s) 246 based on the location of the vehicle 202. For example, if the planning component 224 determines that the vehicle 202 is in a location of a charging station or a location of a maintenance facility, the planning component 224 may automatically set the ride height of vehicle 202 to a predefined ride height and constrain the position of the steering system 246 within a limited range of steering angles based on the predefined ride height to avoid potential damage due to interference between components of the vehicle 202.

In some instances, the planning component 224 may receive a speed of the vehicle 202 from the sensor(s) 206, and may plan the operation of the suspension system(s) 244 and/or the steering system(s) 246 based on the speed of the vehicle 202. For example, if the planning component 224 determines that the vehicle 202 is operating above a speed threshold, the planning component 224 may constrain the position of the suspension system(s) 244 within a limited range of ride height to avoid potential damage due to interference between components of the vehicle 202 and to provide increased stability and cornering capability to the vehicle 202.

The vehicle 202 is further shown including a scheduling component 256. In some instances, the scheduling component 256 may schedule vehicle maintenance and/or inspection based on determining a ride height of the vehicle 202 and the position of the steering system(s) 246 exceed a limited range of steering angles determined based on the ride height. For example, the vehicle 202 may be at a charging location which requires the vehicle 202 to lower the suspension system(s) 244 from a default ride height to a lowered ride height. At the lowered ride height, the fender well of the vehicle 202 may be in contact with the wheels of the vehicle when the position of the steering system(s) 246 exceed the limited range of steering angles determined based on the lowered ride height. In some instances, the scheduling component 256 may schedule vehicle maintenance and/or inspection based on determining a steering angle of the vehicle 202 and the position of the suspension system(s) 244 exceed a limited range of ride height determined based on the steering angle.

The memory 216 may further include one or more map component(s) 228 that may be used by the vehicle 202 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more map component 228 may include at least one map (e.g., images and/or a mesh). In some examples, the vehicle 202 may be controlled based at least in part on the map component 228. That is, the map component 228 may be used in connection with the localization component 218, the perception component 220 (and sub-components), the prediction component 222, and/or the planning component 224 to determine a location of the vehicle 202, identify objects in an environment, generate prediction probability(ies) associated with objects and/or the vehicle 202, and/or generate routes and/or trajectories to navigate within an environment.

In at least one example, the vehicle computing device(s) 204 may include one or more system controller(s) 230, which may be configured to control steering, propulsion, braking, safety, emitters, communication, and other systems of the vehicle 202. These system controller(s) 230 may communicate with and/or control corresponding systems of the drive component(s) 212 and/or other components of the vehicle 202, which may be configured to operate in accordance with a path provided from the planning component 224.

The vehicle 202 may connect to computing device(s) 232 via a network 234 and may include one or more processor(s) 236 and memory 238 communicatively coupled with the one or more processor(s) 236. In at least one instance, the one or more processor(s) 236 may be similar to the processor(s) 214 and the memory 238 may be similar to the memory 216. In the illustrated example, the memory 238 of the computing device(s) 232 stores a remote operation component 240 and/or a model component 242. In at least one instance, the model component 242, after empirical testing and/or simulations, may generate ML models to be used by the perception component 220, as discussed herein. Though depicted as residing in the memory 238 for illustrative purposes, it is contemplated that the remote operation component 240 and the model component 242 may additionally, or alternatively, be accessible to the computing device(s) 232 (e.g., stored in a different component of computing device(s) 232 and/or be accessible to the computing device(s) 232 (e.g., stored remotely). The model component 242 may include functionality to generate models for determining heights/classifications of multi-channel image data, as discussed herein.

As shown, the computing device(s) 232 may store an adjustment lookup table 254. The adjustment lookup table 254 stores permissible and/or impermissible suspension and/or steering settings in different operational drive domains (ODDs). As used herein, an "permissible suspension and/or steering setting" is a steering and/or suspension setting of the vehicle 202 that does not result in potential interference between vehicle components and an "impermissible suspension and/or steering setting" is a steering and/or suspension setting of the vehicle 202 that result in potential interference between vehicle components. The adjustment lookup table 254 is described in greater detail below with respect to FIG. 3. In some instances, the computing device(s) 232 may transmit the adjustment lookup table 254 to the vehicle 202. Additionally, in some instances, a technician may update the adjustment lookup table 254. In some instances, the vehicle 202 may store the adjustment lookup table 254 in the memory 216.

The processor(s) 214 of the vehicle computing device(s) 204 and the processor(s) 236 of the computing device(s) 232 may be any suitable processor capable of executing instructions to process data and perform operations as described herein. By way of example and not limitation, the processor(s) 214 and 236 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 216 vehicle computing device(s) 204 and the memory 238 of the computing device(s) 232 are examples of non-transitory computer-readable media. The memory 216 and 238 may store an operating system and one or more software applications, instructions, programs, and/or data to implement the methods described herein and the functions attributed to the various systems. In various implementations, the memory 216 and 238 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 216 and 238 may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

FIG. 3 illustrates a graphical representation of an adjustment lookup table 300 that may be used by vehicle 102 or vehicle 202. The adjustment lookup table 300 stores permissible and impermissible suspension and/or steering settings in different ODDs. Permissible suspension and/or steering settings are illustrated as the shaded regions 302 and impermissible suspension and/or steering setting are illustrated as the un-shaded regions 304. As shown in FIG. 3, when the steering system 246 of vehicle 202 is set to the maximum steering angle and the suspension system 244 is set to the minimum ride height, the planning component 224 may determine that the suspension and steering settings combination is impermissible and present a potential damage alert to a user of the vehicle 202. As another example, when the steering system 246 of vehicle 202 is set to straight and the suspension system 244 is set to the minimum ride height, the planning component 224 may determine that the suspension and steering settings combination is permissible and control the vehicle 202 based on the suspension and steering settings. While the impermissible suspension and/or steering settings in the illustrated example are shown to correspond to the maximum and minimum extension of the suspension and steering systems, in some examples, impermissible combinations of suspension and steering system may exist at intermediate ride heights and/or steering angles.

Figure 4:
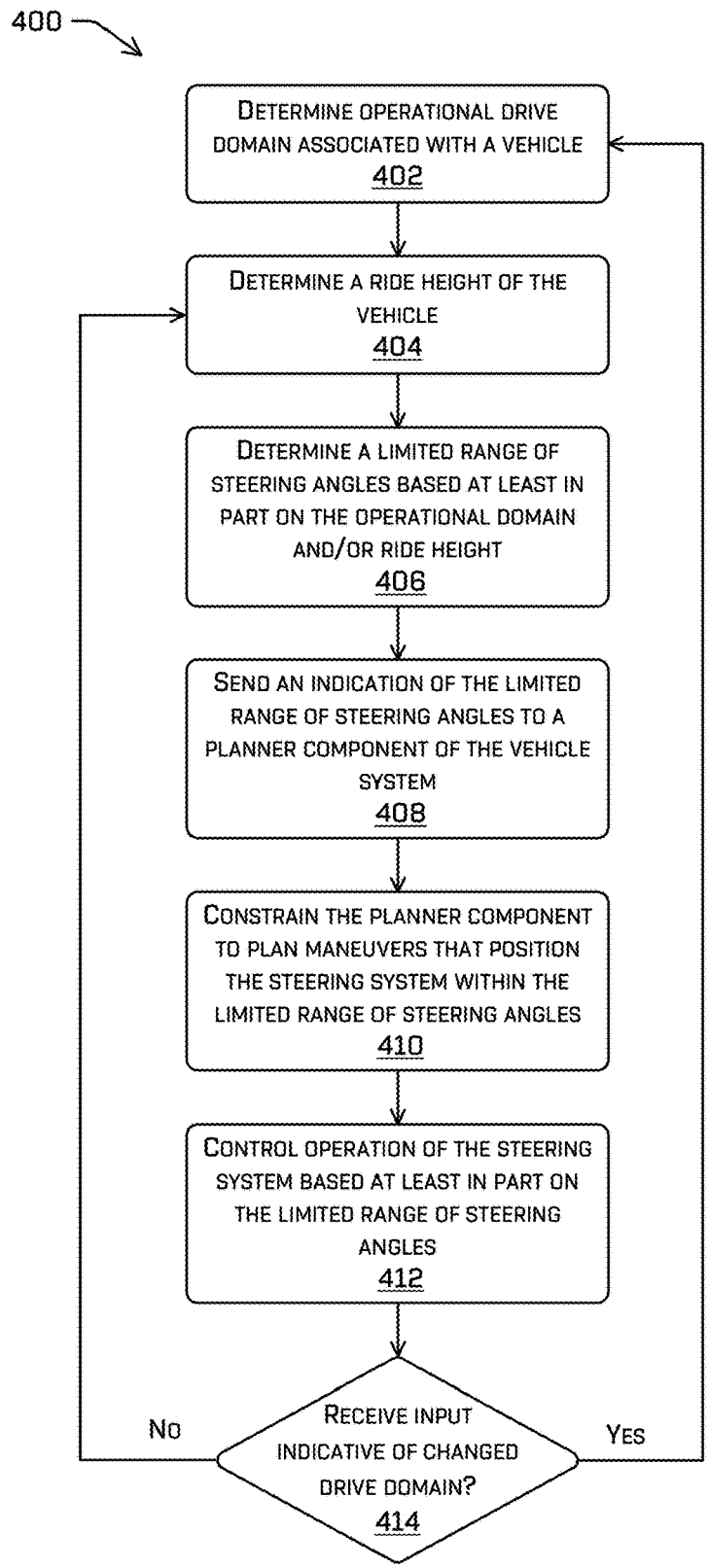
FIG. 4 illustrates an example process for adjusting steering setting(s) of a steering system of a vehicle to provide software steering limits for the vehicle.

FIG. 4 illustrates a process 400 for adjusting the range of steering angles of the steering system(s) 246 of the vehicle 202 for preventing damage due to interference between components of the vehicle 202. The process described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need to be executed. For discussion purposes, the process 400 is described with reference to the environments, architectures and systems described in the examples herein, such as, for example those described with respect to FIGS. 1 and 2, although the process may be implemented in a wide variety of other environments, architectures and systems.

At 402, the process 400 may include determining an operational drive domain associated with the vehicle 202. Example operational drive domains may include an operational drive domain associated with a location of the vehicle 202 (e.g., associated with a road, associated with a charging station, associated with a maintenance facility, etc.), an operational drive domain associated with an instruction received from an operator, and an operational drive domain associated with an operating status of the vehicle 202 (e.g., associated with an autonomous mode, a manual mode, an in-service mode, and/or a charging mode.), an operational drive domain associated with speed of the vehicle 202, etc.

At 404, the process 400 may include determining a ride height of the vehicle 202. For example, the vehicle 202 may include one or more ride height sensor(s) and may determine a current ride height of the vehicle 102 based on data received from the ride height sensor(s). As another example, the vehicle 202 may determine a commanded ride height based on an input from an operator of the vehicle or an input from an automatic stabilization system.

At 406, the process 400 may include determining a limited range of steering angles based at least on part on the operational domain and/or the ride height. For instance, if the vehicle 202 is in a location of a charging station, the vehicle 202 may automatically set the ride height of the vehicle to a pre-defined ride height and constrain the position of the steering system within a limited range of steering angles based on the pre-defined ride height to avoid interference between components of the vehicle 202. The limited range of steering angles is associated with a range of positions of the wheel of the vehicle 202 that are clear of other components of the vehicle 202 at the current ride height or the commanded ride height, and at least one angle outside the limited range of steering angles and within a maximum physical range of steering angles is associated with a position of the wheel of the vehicle 202 that interferes with another component of the vehicle 202 at the current ride height or the commanded ride height. In one example, the limited range of steering angles includes 70% of the maximum physical range of steering angles of the steering system of the vehicle 102.

At 408, the process 400 may include sending an indication of the limited range of steering angles to the planning component 224 of the vehicle 202.

At 410, the process 400 may include constraining the planning component 224 to plan maneuvers that position the steering system(s) 246 within the limited range of steering angles. For example, the planning component 224 may generate an instruction for the steering system(s) 246 to steer the wheel(s) at certain angles, amounts, or percentages.

At 412, the process 400 may include controlling operation of the steering system(s) 246 based at least in part on the limited range of steering angles. For example, the steering system(s) 246 may steer the wheel(s) at certain angles, amounts, or percentages based on the instruction received from the planning component 224.

At 414, the process 400 may include determining whether the vehicle 202 received an input indicative of changed drive domain. At 414, if the vehicle 202 received an input indicative of change drive domain, the process 400 may follow the "YES" route and proceed to 402. If the vehicle does not receive an input indicative of change of drive domain, the process 400 may follow the "NO" route and proceed to 404.

In some instances, determining the setting(s) of the steering system(s) 246, may include determining independent setting(s) for each steering system of the steering system(s) 246. For example, the steering system of the vehicle 202 may be capable of two-wheel steering and/or four-wheel steering. For example, a front of the vehicle 202 may include two wheels and a rear of the vehicle 202 may include two wheels. In some instances, the two wheels at the front may steer the vehicle 202, the two wheels at the rear may steer the vehicle 202, and/or the two wheels at the front and the two wheels at the rear may simultaneously steer the vehicle 202 (i.e., four-wheel steering). Additionally, in four-wheel steering, the front two wheels and the rear two wheels may be controlled or actuated by varying amounts (or percentage) for steering the vehicle 202 along a route or during a particular maneuver. That is, the front two wheels may be controlled or actuated to a first steering angle which may be the same or different than a second steering angle to which the rear two wheels are actuated.

Figure 5:
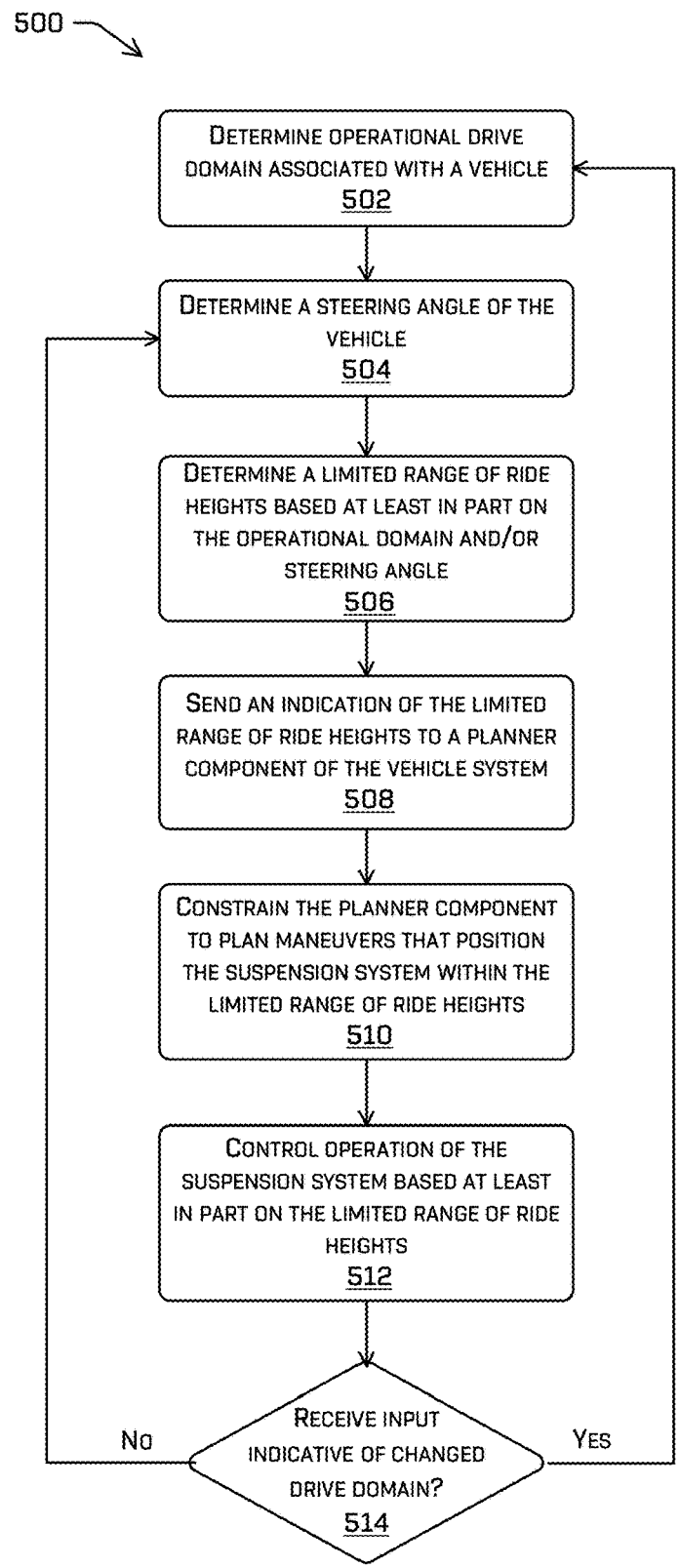
FIG. 5 illustrates an example process for adjusting ride height setting(s) of a suspension system of a vehicle to provide software ride height limits for the vehicle.

FIG. 5 illustrates a process for adjusting the range of ride height of the suspension system(s) 244 of the vehicle 202 for preventing damage due to interference between components of the vehicle 202. The process described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the process is described with reference to the environments, architectures and systems described in the examples herein, such as, for example those described with respect to FIGS. 1 and 2, although the process may be implemented in a wide variety of other environments, architectures and systems.

At 502, the process 500 may include determining an operational drive domain associated with the vehicle 202. For example, the vehicle 202 may include one or more operational drive domains. Example operational drive domains may include an operational drive domain associated with a location of the vehicle 202 (e.g., associated with a road, associated with a charging station, associated with a maintenance facility, etc.), an operational drive domain associated with an instruction received from an operator, and an operational drive domain associated with an operating status of the vehicle 202 (e.g., associated with an autonomous mode, a manual mode, an in-service mode, and/or a charging mode.), an operational drive domain associated with speed of the vehicle 202, etc.

At 5040, the process 500 may include determining a steering angle of the vehicle 202. For example, the vehicle 202 may include one or more steering angle sensor(s) and may determine a current steering angle of the vehicle 102 based on data received from the steering angle sensor(s). As another example, the vehicle 202 may determine a commanded steering angle based on an input from an operator of the vehicle or an input from an automatic stabilization system.

At 506, the process 500 may include determining a limited range of ride heights based at least on part on the operational domain and/or the steering angle. For instance, in an operational drive domain associated with a maintenance facility and/or a command from a maintenance technician, limits on range of steering angle and/or ride height may be removed to allow the vehicle 202 to be controlled through its full range of steering angles and/or ride heights without regard to potential interference between vehicle components. The limited range of ride heights is associated with a range of positions of the wheel of the vehicle 202 that are clear of other components of the vehicle 202 at the current steering angle or the commanded steering angle, and at least one angle outside the limited range of ride height and within a maximum physical range of ride heights is associated with a position of the wheel of the vehicle 202 that interferes with another component of the vehicle 202 at the current steering angle or the commanded steering angle.

At 508, the process 500 may include sending an indication of the limited range of ride heights to the planning component 224 of the vehicle 202.

At 510, the process 500 may include constraining the planning component 224 to plan maneuvers that position the suspension system(s) 244 within the limited range of ride heights. For example, the planning component 224 may generate an instruction for the suspension system(s) 244 to raise or lower the vehicle 202 to certain heights, amounts, or percentages.

At 512, the process 500 may include control operation of the suspension system(s) 244 based at least in part on the limited range of ride heights. For example, the suspension system(s) 244 may raise or lower the vehicle 202 to certain height, amounts, or percentages based on the instruction received from the planning component 224.

At 514, the process 500 may include determining whether the vehicle 202 received an input indicative of changed drive domain. At 514, if the vehicle 202 received an input indicative of change drive domain, the process 500 may follow the "YES" route and proceed to 502. If the vehicle does not receive an input indicative of change of drive domain, the process 500 may follow the "NO" route and proceed to 504.

In some instances, determining the setting(s) of the suspension system(s) 244, may include determining independent setting(s) for each strut(s) of the suspension system(s) 244. For example, in some instances, each of the strut(s) of the suspension system(s) may be independently actuatable and extended to respective lengths to have varying degrees of travel. That is, in some instances, the suspension adjustments may be four independent adjustments, one for each strut of the vehicle 202.

In some examples, the process 400 and/or 500 may be implemented by the vehicles 102 or 202. In other examples, at least a portion of the processes 400 and/or 500 may be performed by a remote computing device, such as computing device 232. For instance, in some examples, operations leading up to and including determining a limited range of steering angles (operation 406) and/or determining a limited range of ride heights (operation 506) may be performed by the remote computing device and then sent to the vehicle to control a planner system of the vehicle.

EXAMPLE CLAUSES

The following paragraphs describe various examples. Any of the examples in this section may be used with any other of the examples in this section and/or any of the other examples or embodiments described herein.

A. A vehicle system comprising: a steering system; a suspension system configured to adjust a ride height of the vehicle system; one or more processors; and non-transitory computer-readable media storing computer-executable instructions that, when executed by the one or more processors, cause the vehicle system to perform operations comprising: determine the ride height of the vehicle system; determine a limited range of steering angles based at least in part on the ride height, the limited range of steering angles being less than a maximum physical range of steering angles of the steering system of the vehicle system; send an indication of the limited range of steering angles to a planner component of the vehicle system that is configured to plan maneuvers of the vehicle system; constrain the planner component to plan maneuvers that position the steering system within the limited range of steering angles; and control, by the planner component, operation of the steering system of the vehicle system based at least in part on the limited range of steering angles.

B. The vehicle system as paragraph A recites, wherein: the limited range of steering angles is associated with a range of positions of a tire of the vehicle system that are clear of other components of the vehicle system at the ride height; and at least one angle outside the limited range of steering angles and within the maximum physical range of steering angles is associated with a position of the tire of the vehicle system that interferes with another component of the vehicle system at the ride height.

C. The vehicle system as paragraph A or B recites, wherein determining the operational drive domain is based at least in part on at least one of: a location of the vehicle system; an instruction received from an operator; or input associated with an environmental condition.

D. The vehicle system as any of paragraphs A-C recite, wherein the instructions further comprise: determining an operational drive domain associated with the vehicle system; and determining the limited range of steering angles based at least in part on the operational drive domain.

E. A method comprising: determining a first setting of a first vehicle actuator included in a vehicle system; determining a limited range of a second setting of a second vehicle actuator of the vehicle system based at least in part on the first setting of the first vehicle actuator, the limited range of the second setting being less than a maximum physical range of the second setting; and controlling operation of the vehicle system based at least in part on the limited range for the second setting.

F. The method as recited in paragraph E, wherein the first setting comprises a ride height setting, wherein the second setting comprises a steering angle setting.

G. The method as recited in paragraph F, wherein the limited range of the steering angle setting is associated with a range of positions of a tire of the vehicle system that are clear of other components of the vehicle system at the ride height setting; and at least one angle outside the limited range of the steering angle setting and within the maximum physical range of the steering angle setting is associated with a position of the tire of the vehicle system that interferes with another component of the vehicle system at the ride height setting.

H. The method as recited in either of paragraphs F or G, wherein determining the first setting comprises at least one of: determining a current ride height of the vehicle system; determining a future anticipated or planned ride height of the vehicle system; or determining a commanded ride height of the vehicle system.

I. The method as recited in paragraph E, wherein the first setting comprises a steering angle setting, wherein the second setting comprises a ride height setting.

J. The method as recited in paragraph I, wherein the limited range of the ride height setting is associated with a range of positions of a chassis of the vehicle system that are clear of other components of the vehicle system at the steering angle setting; and at least one angle outside the limited range of the ride height setting and within the maximum physical range of the ride height setting is associated with a position of the chassis of the vehicle system that interferes with another component of the vehicle system at the steering angle setting.

K. The method as recited in either of paragraphs I or J, wherein determining the first setting of a vehicle system comprises at least one of: determining a current steering angle of the vehicle system; determining a future anticipated or planned steering angle of the vehicle system; or determining a commanded steering angle of the vehicle system.

L. The method as recited in any of paragraphs E-K, wherein controlling operation of the steering system comprises: sending an indication of the limited range of second settings to a planner component of the vehicle system that is configured to plan maneuvers of the vehicle system; and constraining the planner component to plan maneuvers that position the steering system within the limited range of second setting.

M. The method as recited in any of paragraphs E-L, wherein determining the limited range of the second settings comprises at least one of: determining the limited range of the second setting based on a current first setting of the vehicle system; determining the limited range of the second setting based on a future anticipated or planned first setting of the vehicle system; or determining the limited range of the second setting based on a commanded first setting of the vehicle system.

N. The method as recited in any of paragraphs E-M, further comprising: determining an operational drive domain of the vehicle system; wherein determining the limited range of the second setting is further based at least in part on the operational drive domain of the vehicle system.

O. The method as recited in paragraph N, wherein determining the operational drive domain is based at least in part on at least one of: a location of the vehicle system; an instruction received from an operator; or input associated with an environmental condition.

P. One or more non transitory computer readable media storing instructions executable by a processor, wherein the instructions, when executed, cause the processor to perform operations comprising: determine a first setting of a first actuator included in a vehicle system; determine a limited range of a second setting of a second actuator included in the vehicle system based at least in part on the first setting of the first actuator, the limited range of the second setting being less than a maximum physical range of the second setting; and control operation of the vehicle system based at least in part on the limited range for the second setting.

Q. The one or more non-transitory computer-readable media as recited in paragraph P, wherein the first setting comprises a ride height setting, wherein the second setting comprises a steering angle setting.

R. The one or more non-transitory computer-readable media as recited in paragraph Q, wherein the limited range of the steering angle setting is associated with a range of positions of a tire of the vehicle system that are clear of other components of the vehicle system at the ride height setting; and at least one angle outside the limited range of the steering angle setting and within the maximum physical range of the steering angle setting is associated with a position of the tire of the vehicle system that interferes with another component of the vehicle system at the ride height setting.

S. The one or more non-transitory computer-readable media as recited in paragraph P, wherein the first setting comprises a steering angle setting, wherein the second setting comprises a ride height setting.

T. The one or more non-transitory computer-readable media as recited in paragraph S, wherein the limited range of the ride height setting is associated with a range of positions of a chassis of the vehicle system that are clear of other components of the vehicle system at the steering angle setting; and at least one angle outside the limited range of the ride height setting and within the maximum physical range of the ride height setting is associated with a position of the chassis of the vehicle system that interferes with another component of the vehicle system at the steering angle setting.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle system comprising:
   a steering system;
   a suspension system configured to adjust a ride height of the vehicle system;
   one or more processors; and
   non-transitory computer-readable media storing computer-executable instructions that, when executed by the one or more processors, cause the vehicle system to perform operations comprising:
   determine the ride height of the vehicle system;
   determine a limited range of steering angles based at least in part on the ride height, the limited range of steering angles being less than a maximum physical range of steering angles of the steering system of the vehicle system;
   send an indication of the limited range of steering angles to a planner component of the vehicle system that is configured to plan maneuvers of the vehicle system;
   constrain the planner component to plan maneuvers that position the steering system within the limited range of steering angles; and
   control, by the planner component, operation of the steering system of the vehicle system based at least in part on the limited range of steering angles.

2. The vehicle system of claim 1, wherein:
   the limited range of steering angles is associated with a range of positions of a tire of the vehicle system that are clear of other components of the vehicle system at the ride height; and
   at least one angle outside the limited range of steering angles and within the maximum physical range of steering angles is associated with a position of the tire of the vehicle system that interferes with another component of the vehicle system at the ride height.

3. The vehicle system of claim 1, wherein determining the operational drive domain is based at least in part on at least one of:
   a location of the vehicle system;
   an instruction received from an operator; or
   input associated with an environmental condition.

4. The vehicle system of claim 1, wherein the instructions further comprise:
   determining an operational drive domain associated with the vehicle system; and
   determining the limited range of steering angles based at least in part on the operational drive domain.

5. A method comprising:
   determining a first setting of a first vehicle actuator included in a vehicle system;
   determining a limited range of a second setting of a second vehicle actuator of the vehicle system based at least in part on the first setting of the first vehicle actuator, the limited range of the second setting being less than a maximum physical range of the second setting; and
   controlling operation of the vehicle system based at least in part on the limited range for the second setting.

6. The method of claim 5, wherein the first setting comprises a ride height setting, wherein the second setting comprises a steering angle setting.

7. The method of claim 6, wherein
   the limited range of the steering angle setting is associated with a range of positions of a tire of the vehicle system that are clear of other components of the vehicle system at the ride height setting; and
   at least one angle outside the limited range of the steering angle setting and within the maximum physical range of the steering angle setting is associated with a position of the tire of the vehicle system that interferes with another component of the vehicle system at the ride height setting.

8. The method of claim 6, wherein determining the first setting comprises at least one of:
   determining a current ride height of the vehicle system;
   determining a future anticipated or planned ride height of the vehicle system; or
   determining a commanded ride height of the vehicle system.

9. The method of claim 5, wherein the first setting comprises a steering angle setting, wherein the second setting comprises a ride height setting.

10. The method of claim 9, wherein
    the limited range of the ride height setting is associated with a range of positions of a chassis of the vehicle system that are clear of other components of the vehicle system at the steering angle setting; and
    at least one angle outside the limited range of the ride height setting and within the maximum physical range of the ride height setting is associated with a position of the chassis of the vehicle system that interferes with another component of the vehicle system at the steering angle setting.

11. The method of claim 9, wherein determining the first setting of a vehicle system comprises at least one of:
    determining a current steering angle of the vehicle system;
    determining a future anticipated or planned steering angle of the vehicle system; or
    determining a commanded steering angle of the vehicle system.

12. The method of claim 5, wherein controlling operation of the steering system comprises:
    sending an indication of the limited range of second settings to a planner component of the vehicle system that is configured to plan maneuvers of the vehicle system; and
    constraining the planner component to plan maneuvers that position the steering system within the limited range of second setting.

13. The method of claim 5, wherein determining the limited range of the second settings comprises at least one of:
    determining the limited range of the second setting based on a current first setting of the vehicle system;
    determining the limited range of the second setting based on a future anticipated or planned first setting of the vehicle system; or
    determining the limited range of the second setting based on a commanded first setting of the vehicle system.

14. The method of claim 5, further comprising:
    determining an operational drive domain of the vehicle system;
    wherein determining the limited range of the second setting is further based at least in part on the operational drive domain of the vehicle system.

15. The method of claim 14, wherein determining the operational drive domain is based at least in part on at least one of:
    a location of the vehicle system;
    an instruction received from an operator; or
    input associated with an environmental condition.

16. One or more non transitory computer readable media storing instructions executable by a processor, wherein the instructions, when executed, cause the processor to perform operations comprising:
    determine a first setting of a first actuator included in a vehicle system;
    determine a limited range of a second setting of a second actuator included in the vehicle system based at least in part on the first setting of the first actuator, the limited range of the second setting being less than a maximum physical range of the second setting; and
    control operation of the vehicle system based at least in part on the limited range for the second setting.

17. The one or more non-transitory computer-readable media of claim 16, wherein the first setting comprises a ride height setting, wherein the second setting comprises a steering angle setting.

18. The one or more non-transitory computer-readable media of claim 17, wherein
    the limited range of the steering angle setting is associated with a range of positions of a tire of the vehicle system that are clear of other components of the vehicle system at the ride height setting; and
    at least one angle outside the limited range of the steering angle setting and within the maximum physical range of the steering angle setting is associated with a position of the tire of the vehicle system that interferes with another component of the vehicle system at the ride height setting.

19. The one or more non-transitory computer-readable media of claim 16, wherein the first setting comprises a steering angle setting, wherein the second setting comprises a ride height setting.

20. The one or more non-transitory computer-readable media of claim 19, wherein
    the limited range of the ride height setting is associated with a range of positions of a chassis of the vehicle system that are clear of other components of the vehicle system at the steering angle setting; and
    at least one angle outside the limited range of the ride height setting and within the maximum physical range of the ride height setting is associated with a position of the chassis of the vehicle system that interferes with another component of the vehicle system at the steering angle setting.

* * * * *